United States Patent [19]

Sarpeshkar et al.

[11] Patent Number: 5,250,620

[45] Date of Patent: Oct. 5, 1993

[54] HYDROPHILIC POLYVINYLPYRROLIDONE COMPOSITIONS HAVING A LOW COEFFICIENT OF FRICTION

[75] Inventors: Ashok M. Sarpeshkar, Upper St. Clair; Peter H. Markusch, McMurray, both of Pa.; Charles S. Gracik, McMechen, W. Va.

[73] Assignee: Miles Inc., Pittsburgh, Pa.

[21] Appl. No.: 796,100

[22] Filed: Nov. 21, 1991

[51] Int. Cl.$^5$ .................................. C08L 75/04
[52] U.S. Cl. ...................... 525/131; 525/123; 525/125; 528/76; 528/69
[58] Field of Search ............... 525/131; 528/69

[56] References Cited

U.S. PATENT DOCUMENTS

| | | | |
|---|---|---|---|
| 3,216,983 | 11/1965 | Shelanski et al. | 260/88.3 |
| 4,100,309 | 7/1978 | Micklus et al. | 427/2 |
| 4,119,094 | 10/1978 | Micklus et al. | 128/132 R |
| 4,550,126 | 10/1985 | Lorenz | 521/159 |
| 4,585,666 | 4/1986 | Lambert | 427/2 |
| 4,589,873 | 5/1986 | Schwartz et al. | 604/265 |
| 4,642,267 | 2/1987 | Creasy et al. | 428/413 |
| 4,666,437 | 5/1987 | Lambert | 604/265 |
| 4,729,914 | 3/1988 | Kliment et al. | 428/36 |
| 4,835,003 | 5/1989 | Becker et al. | 427/2 |

FOREIGN PATENT DOCUMENTS 396431  11/1990  European Pat. Off. .

OTHER PUBLICATIONS

Chapter 21 of the Handbook of Water Soluble Gums & Resins by Robert L. Davidson, 1980, "Polyvinylpyrrolidone", Blecher et al., pp. 21-1 to 21-21.

*Primary Examiner*—James J. Seidleck
*Assistant Examiner*—Mary Critharis
*Attorney, Agent, or Firm*—Joseph C. Gil; N. Denise Brown

[57] ABSTRACT

The present invention is directed to a hydrophilic composition which is the reaction product of a polyvinylpyrrolidone, an organic monoisocyanate, and an oxyalkylene group containing mono- or di- hydroxyl compound.

7 Claims, No Drawings

HYDROPHILIC POLYVINYLPYRROLIDONE COMPOSITIONS HAVING A LOW COEFFICIENT OF FRICTION

BACKGROUND OF THE INVENTION

There has been a need for lubricious materials which are non-slippery when dry but exhibit lubricious or slippery properties when contacted with aqueous fluids. Applications for such materials are numerous and include fabrication into surface coatings, foams, fibers, films, or solid articles which absorb water, impart wettability or reduce the coefficient of friction in aqueous environments.

Reaction products of polyvinylpyrrolidones and polyisocyanates are known (U.S. Pat. No. 3,216,983). It is known to provide hydrophilic coatings which have low coefficients of friction. Such coatings include polyvinylpyrrolidones (U.S. Pat. No. 4,589,873), polyvinylpyrrolidone-polyurethane interpolymers (U.S. Pat. Nos. 4,100,309 and 4,119,094), and mixtures of hydrophilic polyurethanes and polyvinylpyrrolidones (U.S. Pat. No. 4,835,003 and published European Patent Application 396,431). Another method of providing low coefficient of friction hydrophilic coatings is to first apply a coating of an isocyanate group containing material to the surface to be coated, and to thereafter apply a coating of a solution containing a polyvinylpyrrolidone (U.S. Pat. Nos. 4,585,666, 4,666,437 and 4,729,914). It is also known to prepare hydrophilic, flexible, open cell polyurethane-polyvinylpyrrolidone interpolymer foams (U.S. Pat. No. 4,550,126). Blends of thermoplastic polyurethanes and polyvinylpyrrolidones are also known and are described as exhibiting reduced coefficients of friction when wet (U.S. Pat. No. 4,642,267).

DESCRIPTION OF THE INVENTION

The present invention is directed to a hydrophilic composition which can absorb more than 50% by weight of water and which has a low coefficient of friction when wetted with an aqueous liquid. The invention is also directed to a mixture of the hydrophilic composition with a hydrophobic material. More particularly, the present invention is directed to a hydrophilic composition which comprises the reaction product of:

a) from 1 to 50% by weight, and preferably from 3 to 25% by weight, of a polyvinylpyrrolidone, b) from 1 to 60% by weight, and preferably from 30 to 50% by weight, of an organic monoisocyanate, and c) from 2 to 65% by weight, and preferably from 25 to 58% by weight, of an oxyalkylene group containing compound wherein no more than 30% of the oxyalkylene units are oxypropylene and which is selected from the group consisting of: polyoxyethylene diols, polyoxyethylene monohydroxy compounds, and polyoxyethylene/polyoxypropylene diols and polyoxyethylene/polyoxypropylene monohydroxy compounds, and wherein the percent by weights of components a), b) and c) total 100%. In addition, an inert solvent may be used which can subsequently be removed by distillation.

This hydrophilic composition may not be suitable for all applications since, as it absorbs water, it softens and swells and may not maintain the dimensional stability or the mechanical integrity and strength required for certain applications. In general, the ability to maintain mechanical integrity and strength will be determined by testing a particular composition for the property desired. If the composition is used as a coating (inner layer) for pipes or conveyor belts which are used for transporting aqueous slurries of such materials as minerals or coal, it is important that the mechanical integrity be maintained. The hydrophilic nature of the composition of the invention allows for faster transportation of such slurries due to lower friction.

In those instances where the hydrophilic composition is inadequate in dimensional stability and mechanical integrity, it is preferred to blend the composition with a hydrophobic composition which exhibits low water absorption (i.e., <5% by weight) and which maintains dimensional stability and mechanical integrity when exposed to aqueous liquids. In this preferred embodiment, the composition of the present invention comprises:

1) from 5 to 95% by weight, and preferably from 50 to 95% by weight of a hydrophilic composition which can absorb more than 50% by weight of water and which has a low coefficient of friction when wetted with an aqueous liquid, and which comprises the reaction product of:

a) from 1 to 50% by weight, and preferably from 3 to 25% by weight, of a polyvinylpyrrolidone, b) from 1 to 60% by weight, and preferably from 30 to 50% by weight, of an organic monoisocyanate, and c) from 2 to 65% by weight, and preferably from 25 to 58% by weight, of an oxyalkylene group containing compound wherein no more than 30% of the oxyalkylene units are oxypropylene and which is selected from the group consisting of: polyoxyethylene diols, polyoxyethylene monohydroxy compounds, and polyoxyethylene/polyoxypropylene diols and polyoxyethylene/polyoxypropylene monohydroxy compounds, and wherein the per cent by weights of components a), b) and c) total 100%, and 2) from 5 to 95% by weight, and preferably from 5 to 50% by weight of a hydrophobic polyurethane which absorbs less than 5% by weight of water and which is prepared by reacting:

d) an organic di- and/or polyisocyanate, and e) a hydroxyl group containing compound having from 2 to 4 hydroxyl groups and having a molecular weight of from 62 to 3000, at an NCO:OH equivalent ratio of from 1.5:1 to 1:1.5, and wherein the percent by weights of components 1) and 2) total 100%. As noted above, an inert solvent may be used in the preparation of the hydrophilic composition.

Polyvinylpyrrolidones a) are known and are generally produced by the polymerization of N-vinyl pyrrolidone. In general, the polyvinylpyrrolidones useful herein have average molecular weights as determined by intrinsic viscosity measurement of from 50,000 to 500,000, preferably from 200,000 to 500,000, and most preferably from 300,000 to 400,000. Further details about polyvinylpyrrolidones and their method of manufacture are described in Chapter 21 of the Handbook of Water Soluble Gums and Resins by Robert L. Davidson, 1980, "Polyvinylpyrrolidone", Blecher et al, pages 21-1 through 21-21, the disclosure of which is herein incorporated by reference. Particularly preferred is the commercially available polyvinylpyrrolidone from GAF Corporation known as K-90.

Useful organic monoisocyanates b) include substantially any aliphatic, cycloaliphatic or aromatic monoisocyanate. Aliphatic monoisocyanates which contain more than 5 and up to 20 carbon atoms in the molecule exclusive of the isocyanate group are preferred. Specific isocyanates useful herein include cyclohexyl isocyanate; phenyl isocyanate; vinyl phenyl isocyanate; tetradecyl isocyanate; hexadecyl isocyanate; octadecyl isocyanate; isopentyl isocyanate; isononyl isocyanate; and monoisocyanates derived from amines which can be obtained synthetically from resinic acids or fatty acids, for example, dihydroabietyl isocyanate, oleyl or stearyl isocyanate. Octadecyl isocyanate is the presently preferred isocyanate.

Reaction of the polyvinylpyrrolidone with the monoisocyanate is generally carried out by mixing the polyvinylpyrrolidone with the monoisocyanate and reacting the components at temperatures between 30° C. and 200° C., preferably between 45° C. and 110° C., optionally with stirring. Lower reaction temperatures could also in principle be used but the length of time which would then be required for complete reaction of the components to obtain suitable reaction products for the process would be uneconomical. A tin catalyst of the type commonly used to catalyze the reaction between an isocyanate group and water is generally also used. When used, the catalyst is used in amounts of from 0.1 to 10% by weight, and preferably from 0.02 to 0.5% by weight based on the total weight of the reactants.

The ratio of polyvinylpyrrolidone to monoisocyanate is generally chosen so that all the water content of the polyvinylpyrrolidone is reacted. In general, weight ratios of polyvinylpyrrolidone to monoisocyanate of from 1:60 to 50:1 are sufficient.

The hydroxyl functional oxyalkylene group containing compound materials c) is a member selected from the group consisting of: polyoxyethylene diols, polyoxyethylene monohydroxy compounds, polyoxyethylene/polyoxypropylene diols and polyoxyethylene/polyoxypropylene monohydroxy compounds. No more than 30% of the oxyalkylene units are oxypropylene. In general, the molecular weight of such material will be from 500 to 5000. These materials are generally known in the polyurethane art and are commercially available. Specific materials include polyoxyethylene diols sold under the tradename "CARBOWAX" available from Union Carbide. Particularly preferred is a 2145 molecular weight polyether monohydric alcohol prepared from n-butanol, ethylene oxide and propylene oxide (molar ratio of EO to PO of 83:17).

The material c) is generally mixed with the polyvinylpyrrolidone-monoisocyanate product and heated to a temperature of from 50° to 100° C. with stirring for a time sufficient to allow all remaining isocyanate groups to react (generally for 1 to 4 hours).

In the most preferred embodiment, the resultant hydrophilic composition is then mixed with a hydrophobic polyurethane composition. The hydrophobic composition is prepared by reacting an isocyanate with a polyol. Starting di- and/or polyisocyanate components d) suitable for use herein include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are 4,4'-methylenebis(cyclohexyl isocyanate); isophorone diisocyanate; m- and p- tetramethyl xylene diisocyanate; ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4- and/or -4,4'-diisocyanate; naphthylene-1,5-diisocyanate; triphenyl methane-4,4',4''-triisocyanate; polyphenyl polymethylene polyisocyanates of the type obtained by condensing aniline with formaldehyde, followed by phosgenation and described, for example, in British Pat. Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent 1,902,007 (U.S. Pat. No. 3,152,162); diisocyanates of the type described in U.S. Pat. No. 3,492,330; and polyisocyanates containing allophanate groups of the type described, for example, in British Patent 993,890, in Belgian Patent 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Patents 1,022,789; 1,222,067 and 1,027,394 and in German Offenlegungsschriften Nos. 1,929,034 and 2,004,408; polyisocyanates containing urethane groups of the type described, for example, in Belgian Patent 752,261 or in U.S. Pat. No. 3,394,164; polyisocyanates containing acylated urea groups according to German Patent 1,230,778 and polyisocyanates containing bioret groups of the type described, for example, in German Patent 1,101,394 (U.S. Pat. Nos. 3,124,605 and 3,201,372) and in British Patent 889,050 are also suitable.

Polyisocyanates produced by telomerization reactions of the type described, for example, in U.S. Pat. No. 3,654,106; polyisocyanates containing ester groups of the type described for example, in British Patents. 965,474 and 1,072,956, in U.S. Pat. No. 3,567,763 and in German Patent 1,231,688; reaction products of the above-mentioned isocyanates with acetals according to German Patent 1,072,385 and polyisocyanates containing polymeric fatty acid residues, according to U.S. Pat. No. 3,455,883 are still further examples of suitable isocyanates.

Aromatic polyisocyanates which are liquid at the processing temperature may also be used. Preferred starting polyisocyanates include derivatives of 4,4'-diisocyanatodiphenylmethane which are liquid at room temperature, for example, liquid polyisocyanates containing urethane groups of the type obtainable in accordance with German Patent 1,618,380 (U.S. Pat. No. 3,644,457). These may be produced for example, by reacting 1 mol of 4,4'-diisocyanato-diphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent 1,092,007 (U.S. Pat. No. 3,152,162). Mixtures of these preferred polyisocyanates can also be used.

Also preferred are the polyphenyl-polymethylene polyisocyanates obtained by the phosgenation of an aniline/formaldehyde condensate.

Also necessary for preparing the preferred compositions are hydroxyl group containing compounds e). These compounds will typically have molecular weights of 62 to about 3,000, and preferably from 500 to 1000. Examples of suitable compounds include the relatively low molecular weight diols and triols, tetrols, polyesters, polyethers, polythioethers, polyacetals, polycaprolactones and polycarbonates containing from 2 to 4, and preferably 2 or 3 hydroxyl groups, and having the requisite molecular weight of the type known for the production of polyurethanes.

The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water or alcohols. Examples of suitable alcohols include 4,4'-dihydroxy diphenyl propane, ethylene glycol, propylene glycol, trimethylolpropane, glycerin and the like. It is preferred to use polyethers which contain substantial amounts of secondary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

The alcohols noted above can also be used either as such or as relatively low molecular weight alkoxylation products.

Suitable examples of polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

In preparing the preferred compositions herein, the hydrophilic composition is generally maintained at a temperature of from about 60° to about 100° C. for a period of from 1 to 2 hours. The amounts of the polyisocyanate d) and polyol e) are then added with stirring. An amount of catalyst, such as known metal organic catalysts (e.g., dibutyltin dilaurate) or tertiary amines, may be used. The catalyst may be added prior to, at the same time, or after addition of the polyisocyanate and polyol or can be premixed with the polyol. Typically, the amount of catalyst added is from 0.01 to 1.0% by weight based upon the weight of all the reactants. Once the catalyst is uniformly dispersed, the thickening mixture is cast into a suitable mold and post cured at a temperature of from 80° to 120° C. for from 0.5 to 16 hours. The part is then removed from the mold after reaching ambient temperature.

The invention is further illustrated but is not intended to be limited by the following examples in which all parts and percentages are by weight unless otherwise specified.

EXAMPLES

Example 1

A water-free hydrophilic composition was prepared from about 580 parts of octadecylisocyanate, about 77 parts of polyvinylpyrrolidone (K-90 polyvinylpyrrolidone from GAF Corporation), about 790 parts of a 1000 molecular weight polyoxyethylene diol, and 0.3 parts of dibutyltin dilaurate. The monoisocyanate was charged at ambient temperature into a 1 gallon 3-neck flask equipped with a thermometer and a stirrer. The isocyanate was stirred and heated to 60° C. while adding the polyvinylpyrrolidone portionwise to obtain a slurry. The dibutyltin dilaurate was then added to this slurry and stirring continued overnight at 60° C. (the slurry was kept at this temperature for a total of about 17 hours). The isocyanate content was found to be 11.41%. A calculated amount of the polyoxyethyleneglycol was added to the flask and the stirring continued under vacuum for 2 hours at 80° C. by which time the isocyanate content of the slurry was reduced to zero. The composition was cast into stainless steel molds and cured at 80° C. for 2 hours. The molds were then allowed to reach ambient temperature and the plaques demolded.

Example 2

Using the above hydrophilic composition, a hydrophilic/hydrophobic polymer was prepared using about 75 parts of the hydrophilic composition, about 12 parts of hexamethylenediisocyanate, about 14 parts of trimethylol-propane/propylene oxide adduct (having a molecular weight of about 300) and about 0.50 of dibutyltin dilaurate.

The hydrophilic composition was weighed into a clean and dry 1 pint can and maintained at 80° C. The isocyanate and polyol, both at ambient temperature, were added to it. The contents of the can were rapidly stirred for 30 seconds, and the catalyst added. Stirring was continued for another 30 seconds and the thickening reaction mixture was poured into a mold and cured in an oven at 80° C. for 30 minutes. The part was demolded after allowing the mold to attain ambient temperature. The kinetic coefficient of friction of the resultant product was determined by ASTM-D-1894-75 using a Shore 35A polyurethane as the substrate. The kinetic coefficient of friction in the dry state was 1.03 and in the wet state was 0.12

Example 3

About 427 parts of octadecylisocyanate and about 107 parts of polyvinylpyrrolidone (K-90 polyvinylpyrrolidone available from GAF Corporation) were charged at ambient temperature into a 5 liter 3-neck flask equipped with a thermometer and a stirrer. The mixture was stirred and heated to 60° C. to obtain a free flowing slurry. 0.25 parts of dibutyltin dilaurate were added to this slurry and stirring continued overnight at 60° C. The isocyanate content was determined to be 6.82%. About 415 parts of a 1000 molecular weight polyoxyethyleneglycol were added to the reactor and the temperature was raised to 80° C. After continuous stirring under vacuum for two hours at 80° C., the isocyanate content was reduced to zero. The material was held at 80° C. until used. This product was not tested for kinetic coefficient of friction.

Example 4

120 parts of hydrophilic composition produced in Example 3 were charged into a clean dry pint can at 80° C. About 46 parts of 4,4'-methylenebis(cyclohexyl isocyanate) and about 34 parts of a polyether triol (a 306 molecular weight adduct of trimethylolpropane and propylene oxide), both at ambient temperature, were added to the can. The raw materials were rapidly stirred for 30 seconds, and 1 part of dibutyltin dilaurate was added. Stirring was continued for an additional 30 seconds. The reacting mixture was then poured into a mold and cured in an oven at 80° C. for 30 minutes. The part was demolded after allowing the mold to attain room temperature. The kinetic coefficient of friction of the resultant product in the dry state was 0.79, and in the wet state was 0.25.

Example 5

About 428 parts of octadecylisocyanate and about 160 parts of polyvinylpyrrolidone (K-90 polyvinylpyrrolidone available from GAF Corporation) were charged at ambient temperature into a 5 liter 3-neck flask equipped with a thermometer and a stirrer. The mixture was stirred and heated to 60° C. to obtain a free flowing slurry. 0.25 parts of dibutyltin dilaurate were added to this slurry and stirring continued overnight at 60° C. The isocyanate content was determined to be 4.18%. About 285 parts of a 1000 molecular weight polyoxyethyleneglycol were added to the reactor and the temperature was raised to 80° C. After continuous stirring under vacuum for two hours at 80° C., the isocyanate content was reduced to zero. The material was held at 80° C. until used. This product was not tested for kinetic coefficient of friction.

Example 6

180 parts of hydrophilic composition produced in Example 5 were charged into a clean dry pint can at 80° C. About 7 parts of 4,4'-methylenebis(cyclohexyl isocyanate) and about 13 parts of a polyether triol (a 673 molecular weight adduct of glycerin and propylene oxide), both at ambient temperature, were added to the can. The raw materials were rapidly stirred for 30 seconds, and 1 part of dibutyltin dilaurate was added. Stirring was continued for an additional 30 seconds. The reacting mixture was then poured into a mold and cured in an oven at 80° C. for 30 minutes. The part was demolded after allowing the mold to attain room temperature. The kinetic coefficient of friction of the resultant product in the dry state was 1.52 and in the wet state was 0.10.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hydrophilic composition which can absorb more than 50% by weight of water and which has a low coefficient of friction when wetted with an aqueous liquid, and which comprises the reaction product of:
   a) from 1 to 50% by weight of a polyvinylpyrrolidone,
   b) from 1 to 60% by weight of an organic monoisocyanate, and
   c) from 2 to 65% by weight of an oxyalkylene group containing compound wherein no more than 30% of the oxyalkylene units are oxypropylene and which is selected from the group consisting of: polyoxyethylene diols, polyoxyethylene monohydroxy compounds, and polyoxyethylene/polyoxypropylene diols and polyoxyethylene/polyoxypropylene monohydroxy compounds, and wherein the percent by weights of components a), b) and c) total 100%.

2. The composition of claim 1, wherein component a) is used in an amount of from 3 to 25% by weight, component b) is used in an amount of from 30 to 50% by weight, and component c) is used in an amount of from 25 to 58% by weight.

3. The composition of claim 1, wherein said polyvinylpyrrolidone has an average molecular weight as determined by intrinsic viscosity measurement of from 50,000 to 500,000.

4. The composition of claim 3, wherein said polyvinylpyrrolidone has an average molecular weight as determined by intrinsic viscosity measurement of from 200,000 to 500,000.

5. The composition of claim 4, wherein said polyvinylpyrrolidone has an average molecular weight as determined by intrinsic viscosity measurement of from 300,000 to 400,000.

6. The composition of claim 1, wherein said monoisocyanate is an aliphatic monoisocyanate containing more than 5 and less than 20 carbon atoms exclusive of the isocyanate group.

7. The composition of claim 1, wherein said oxyalkylene group containing compound has a molecular weight of from 500 to 5000.

* * * * *